UNITED STATES PATENT OFFICE.

CARL HEIDENREICH, OF LEVERKUSEN, NEAR COLOGNE, GERMANY, ASSIGNOR TO SYNTHETIC PATENTS CO., INC., OF NEW YORK, N. Y., A CORPORATION OF NEW YORK.

AZO DYE AND PROCESS OF DYEING.

1,183,378.      Specification of Letters Patent.      Patented May 16, 1916.

No Drawing.     Application filed March 27, 1915. Serial No. 17,575.

*To all whom it may concern:*

Be it known that I, CARL HEIDENREICH, doctor of philosophy, chemist, citizen of the German Empire, residing at Leverkusen, near Cologne, Germany, have invented new and useful Improvements in Azo Dyes and Processes of Dyeing, of which the following is a specification.

My invention relates to new and valuable azo dyes and the production of such dyes on the fiber. They are obtained by combining diazo compounds of aromatic amins with bisbeta-oxynaphthoyl diamins. The new dyes having most probably the following general formula:

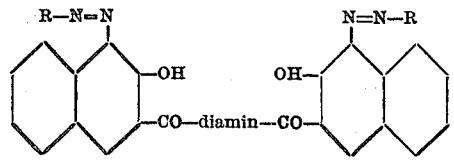

wherein R means an aromatic radical e. g. phenyl, naphthyl, anthraquinonyl, etc.

The new dyes are after being dried and pulverized in the shape of their alkali-metal salts dark powders soluble in concentrated sulfuric acid; yielding upon reduction with tin and hydrochloric acid an aromatic amin and bis-1-amino-2-oxy-3-naphthoyldiamin having most probably the following general formula:

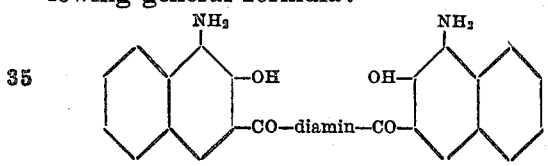

They dye the fiber shades fast to washing and boiling. The dyes may also be produced on the fiber.

In order to illustrate the new process more fully the following example is given, the parts being by weight:—13.8 parts of 3-nitro-4-toluidin are diazotized by means of 50 parts of hydrochloric acid and 6.9 parts of nitrite. The diazo solution is then added at 0° while stirring to a solution of 28.2 parts of bisoxynaphthoyl-2.6-toluylenediamin-4-sulfonic acid (sodium salt) in 500 parts of water, 10 parts of caustic soda lye (40 per cent.) and 150 parts of a 16 per cent. sodium carbonate solution. The dye separates. It is filtered off and dried. After being dried and pulverized it is a brown powder insoluble in water and in alcohol, soluble in concentrated sulfuric acid with a reddish-violet coloration; and yielding upon reduction with tin and hydrochloric acid 3.4-diaminotoluene and bis-1-amino-2-oxy-3-naphthoyl-2.6-toluylenediamin-4-sulfonic acid. It dyes cotton red shades.

Production of the dyestuff on the fiber:— The cotton goods are impregnated in the well known manner with the following solution: 25 grams of beta-oxynaphthoyl-2.6-toluylenediamin-4-sulfonic acid (sodium salt) having in a free state most probably the formula:

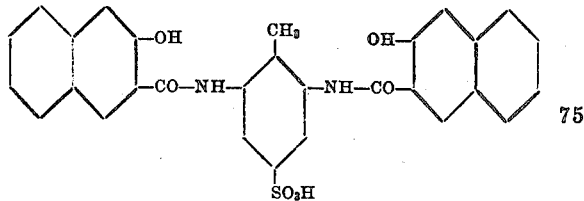

30 grams of caustic soda lye (36° Bé.) and 50 grams of ricinoleate of soda (50 per cent.) in 1000 grams of water. Upon the dried cotton goods the thickened diazo compound is printed. Then it is washed and soaped.

The following shades can thus be obtained:—

| From diazotized | | |
|---|---|---|
| " " | dianisidin | Blue. |
| " " | tolidin | Dark brown. |
| " " | 3-nitro-4-toluidin | Red. |
| " " | ortho-nitranilin | Scarlet. |
| " " | para-nitranilin | Red. |
| " " | para-nitro-ortho-anisidin | Bordeaux. |
| " " | 4-nitro-2-toluidin | Reddish orange. |
| " " | meta-nitranilin | Orange. |
| " " | alpha-naphthylamin | Violet-bordeaux. |
| " " | beta-naphthylamin | Red-bordeaux. |
| " " | alpha-aminoanthraquinone | Red. |

The shades are fast to washing and boiling.

Other oxynaphtoyldiamins can be used, e. g. the bisoxynaphthoyl-2.6-toluylenediamin-4-carboxylic acid or the bis-beta-oxynaphthoyl-4.4'-diaminodiphenylamin sulfonic acid. Instead of the diazo compounds the nitrosamins can be used.

I claim:—

1. As new articles of manufacture the azo dyes, which may be obtained from diazo compounds and a bis-beta-oxynaphthoyldiamin and which have most probably the formula:

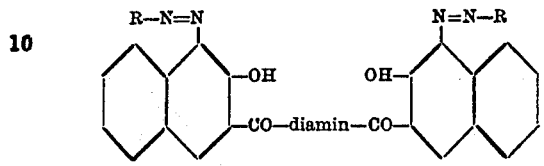

(R means an aromatic radical e. g. phenyl, naphthyl, anthraquinonyl, etc.), which are after being dried and pulverized in the shape of their salts dark powders soluble in concentrated sulfuric acid; yielding upon reduction with tin and hydrochloric acid an aromatic amin and a bis-1-amino-2-oxy-3-naphthoyldiamin having most probably the following formula:

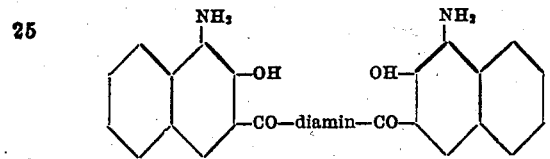

dyeing shades fast to washing and to boiling, substantially as described.

2. As new articles of manufacture the azo dyes, which may be obtained from diazo compounds and a bis-beta-oxynaphthoyldiamin and which have most probably the formula:

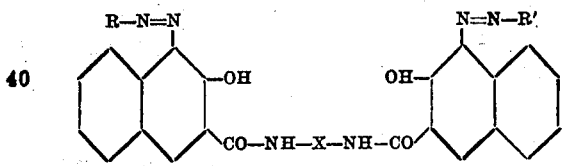

wherein R and R' represent aromatic radicals and X represents a radical of the benzene series, which are after being dried and pulverized in the shape of their salts dark powders soluble in concentrated sulfuric acid; yielding upon reduction with tin and hydrochloric acid and aromatic amin and a bis-1-amino-2-oxy-3-naphthoyldiamin.

3. As new articles of manufacture the azo dyes, which may be obtained from diazo compounds and a bis-beta-oxy-naphthoyldiamin and which have most probably the formula:

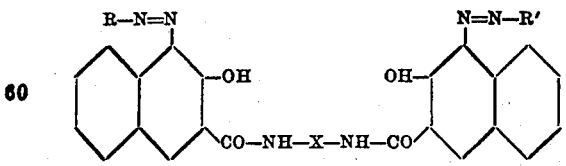

wherein R, R' and X represent radicals of the benzene series, which are after being dried and pulverized in the shape of their salts dark powders soluble in concentrated sulfuric acid; yielding upon reduction with tin and hydrochloric acid an aromatic amin and a bis-1-amino-2-oxy-3-naphthoyldiamin.

4. As new articles of manufacture the azo dyes, which may be obtained from diazo compounds and a bis-beta-oxynaphthoyldiamin and which have most probably the formula:

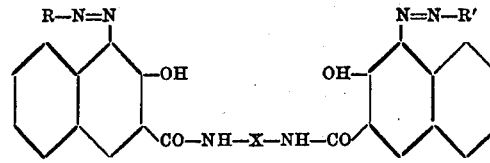

wherein R and R' represent aromatic radicals containing nitro-groups and X represents a radical of the benzene series, which are after being dried and pulverized in the shape of their salts dark powders soluble in concentrated sulfuric acid; yielding upon reduction with tin and hydrochloric acid an aromatic diamin and a bis-1-amino-2-oxy-3-naphthoyldiamin.

5. As new articles of manufacture the azo dyes, which may be obtained from diazo compounds and a bis-beta-oxy-naphthoyldiamin and which have most probably the formula:

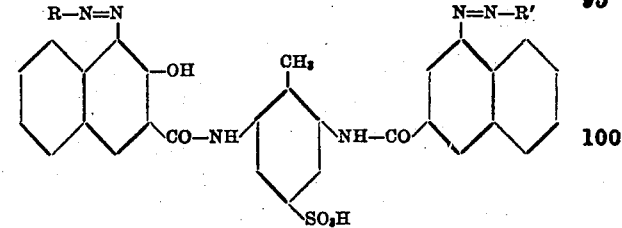

wherein R and R' represent aromatic radicals, which are after being dried and pulverized in the shape of their salts dark powders soluble in concentrated sulfuric acid; yielding upon reduction with tin and hydrochloric acid an aromatic amin and a bis-1-amino-2-oxy-3-naphthoyldiamin.

6. As a new article the disazo dye which may be obtained from diazotized 3-nitro-4-toluidin and bisoxynaphthoyl-2.6-toluylenediamin-4-sulfonic acid having in a free state most probably the formula:

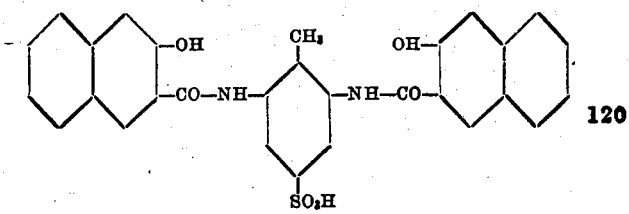

which is after being dried and pulverized a brown powder insoluble in water and in alcohol, soluble in concentrated sulfuric acid with a reddish-violet coloration; and yielding upon reduction with tin and hydrochloric acid 3.4-diamino-toluene and bis-1-amino-2-oxy-3-naphthoyl-2.6-toluylenediamin-4-sulfonic acid; and dyeing cotton red shades, substantially as described.

7. Production of azo dyes on the fiber consisting in impregnating the fiber with a solution of a bis-beta-oxynaphthoyldiamin and treating it with a diazo compound, substantially as described.

In testimony whereof I have hereunto set my hand in the presence of two subscribing witnesses.

CARL HEIDENREICH. [L. S.]

Witnesses:
HELEN NUFER,
ALBERT NUFER.